Patented Sept. 15, 1936

2,054,444

UNITED STATES PATENT OFFICE 2,054,444

PROCESS FOR THE PRODUCTION OF RESIN IMPREGNATED CELLULOSIC MATERIAL AND THE PRODUCTS OBTAINABLE THEREBY

Peter Pinten, Cologne-Deutz, Germany, assignor to Dynamit-Actiengesellschaft vormals Alfred Nobel & Co., Troisdorf, near Cologne, Germany No Drawing. Application November 24, 1933, Serial No. 699,504. In Germany November 28, 1932

6 Claims. (Cl. 154—2)

This invention is concerned with a method of impregnating cellulosic material with phenol aldehyde condensation products and the hardening of such impregnated material by the application of heat and pressure. The invention also concerns the new product obtainable in accordance with the beforementioned process.

It is an object of the present invention to completely impregnate cellulosic material by means of particular phenol aldehyde condensation products and to treat the material thus completely impregnated by the application of heat and pressure.

Another object of the present invention is the production of composite structures consisting of two or more sheets of cellulosic material completely impregnated and heat and pressure treated as beforementioned.

Other objects of the invention are the final products obtainable by completely impregnating cellulosic material with particular phenol aldehyde condensation products and the application of heat and pressure thereto and the composite structures obtainable by combining sheets of cellulosic material so impregnated and aftertreated.

Phenol aldehyde condensation products have been heretofore employed in the production of water-proofed or electrically insulated papers. Composite or laminated structures have been produced by the use of phenol aldehyde condensation products and paper prior to this invention. However, in the treatment of paper prior to this invention it has been the custom to apply a solid or liquid phenol aldehyde condensation product to the surface of the paper in the same manner that a lacquer or paint would be applied to paper. This application results in a relatively slight penetration of the phenol aldehyde condensation product into the paper, and composite structures made in this fashion are really nothing more than alternate layers of paper and resin, the resin acting mainly as an adhesive to bind the sheets of paper into one solid structure. It has also been proposed to dissolve solid phenol aldehyde condensation products in organic solvents and to apply the solution to the surface of the paper in an attempt to obtain a greater penetration of the phenol aldehyde condensation product into the paper itself. Processes of the above type are illustrated in U. S. Patent 1,019,406. Such procedures are, however, inadequate for the production of completely impregnated papers or for the production of composite paper structures which are completely impregnated with phenol aldehyde resins. In order to solve the existing difficulties in the complete impregnation of paper, it has even been proposed to incorporate the phenol aldehyde condensation products with the paper pulp, but this method has also been found to be of little value and fails to give the required results. The papers produced by all the processes referred to above are characterized by an uneven distribution of the phenol aldehyde resin in the final product and by the irregular absorption properties of the various parts of the impregnated paper.

It has now been found that by suitably selecting particular phenol aldehyde condensation products, it is possible to thoroughly and completely impregnate cellulosic materials and to obtain a final hardened product in which the phenol aldehyde resin is uniformly distributed throughout every part of the cellulosic material. The particular phenol aldehyde condensation products which are capable of penetrating deeply into cellulosic material are those condensation products which have a high solubility for water and are characterized by having a solubility for water which amounts to at least 18% at 25° C. Condensation products of this class will, for example, rapidly and completely penetrate ordinary paper sheets so that the phenol aldehyde condensation product is evenly distributed throughout the entire sheet and so that the phenol aldehyde resin content of the paper is uniform throughout and the absorption and insulating qualities of the final product do not vary.

Phenol aldehyde condensation products are usually prepared in the presence of water by heating a phenol with an aqueous solution of an aldehyde. As the condensation reaction proceeds, the condensate constantly precipitates and gradually passes from a hydrous and liquid phase into a more solid phase which contains very little water. For the purpose of this invention it is important to interrupt the condensation reaction at a point so that the separated condensation product will exhibit a solubility for water which is at least 18% at 25° C. It is immaterial whether the condensation is carried out in the presence of acid or alkaline agents, provided, of course, that a phenol aldehyde condensation product is utilized which is capable of being hardened by the application of heat and pressure. Since the solubility of water in the phenol aldehyde condensation product depends to a certain degree upon the temperature and since a temperature of about 25° C. represents the optimum temperature for measurement of this solubility property, the temperature of 25° C. is selected as the standard of comparison for determining the water solubility of the condensation product used according to the invention. In order to realize the benefits of the invention, it is necessary that the water solubility or absorbability of the phenol aldehyde condensation product at 25° C. should be at least 18% by weight.

It is not necessary that the condensation product contain at least 18% of water at the time it is applied to the cellulosic material and it should be pointed out that this characteristic property is employed as a means of identifying and characterizing the stage of condensation which is necessary to obtain proper condensation products for impregnation. For example, it is possible to prepare a phenol aldehyde condensation product having the proper solubility or absorbability for water, to remove the water from this product under conditions which prevent further condensation and hardening of the resin, to then dissolve the water-free condensation product in an organic solvent and apply the solution of the condensation product to cellulosic material. In this manner, completely impregnated cellulosic material may be obtained and the final hardened product contains the phenol aldehyde resin uniformly distributed throughout.

It is also possible to employ the hydrous or water-containing condensation product in impregnating the cellulosic material, provided that the water solubility or absorbability of the condensation product is at least 18% at 25° C.

The solubility for water of the condensation product may be determined by neutralizing the condensation product, decanting the excess water from the condensation product and determining the water content of the condensation product by expelling the water contained in the condensation product by boiling with xylene.

It should be pointed out that the applicant is not fully informed regarding the exact state of the water which is contained in the condensation product nor of the exact manner by which the water is taken up by the condensation product, i. e. the water may be dissolved by the condensation product or absorbed by the condensation product or it may exist in the condensation product in a different state. It is the applicant's intention to cover these various possibilities by the expression "solubility for water". The "solubility for water" of any particular condensation product can be readily and definitely determined by the method outlined above.

It is also possible to prepare the condensation product under substantially anhydrous conditions as, for example, by reacting a phenol with trioxy methylene. The solubility for water of such a condensation product can be determined by admixing the condensation product with water, decanting the excess water and boiling the water containing condensation product with xylene, as described above.

The preferred embodiments of the invention are described in the following examples, the invention, however, is not limited to the specific procedures described in the examples nor to the products there disclosed.

*Example 1.*—100 parts of cresol are condensed with 120 parts of formalin (30%) and 0.2 part of caustic soda for 1 hour at 100° C. The reaction mixture is cooled immediately and the supernatant water is separated by means of a separating funnel. A liquid resin having a water content of about 27% by weight is thereby obtained.

The liquid condensation product may be applied to sheets of paper. It will be found that the condensation product readily penetrates the paper and that after drying under heat and pressure a final product will be obtained which is thoroughly impregnated in an even manner with cresol formaldehyde resin. The impregnated product may be shaped as desired and, if necessary, molded.

*Example 2.*—1000 parts of phenol are heated with 1500 parts of formalin (30%) and 10 parts of oxalic acid for 3 hours at 100° C. The condensation product is then heated at about 45° under decreased pressure to remove the greater part of the water contained therein. A portion of the syrupy resin thus obtained is thoroughly admixed with equal parts of water, the supernatant water removed and the water content of the resin determined. It will be found that the water content is about 35%. The remainder of the syrupy resin is dissolved in alcohol and the solution is employed for impregnating paper.

*Example 3.*—A condensation product prepared according to Example 1 is mixed with equal parts of an about 50% alcoholic solution of a solid phenol formaldehyde condensation product. The alcoholic solution is employed for impregnating paper and the impregnated paper is after-treated in the usual way.

The particular phenol aldehyde condensation products which are employed according to the present invention are absorbed by sheets of paper in such a manner that the side of the paper coated therewith has the same appearance as the uncoated side. Consequently it is possible to even employ paper which is coated on one side by applying sheets of untreated or lacquered papers to either side of the coated paper and combining the sheets by the application of heat and pressure. Other resins and materials may be used in combination with the particular condensation products which are described in this application. For example, solid resins such as shellac, novolak, etc., may be dissolved in the condensation product prior to the impregnation of the paper, or solutions of urea resin, acetyl cellulose, etc., may be mixed with the condensation product prior to impregnation.

By further working paper sheets impregnated with the thin condensation product, preferably after drying under heat and pressure, a final product is obtained which is practically homogeneous in structure and which can be put to various uses without any danger of exposing the free fiber. The stability of such products is far superior to those obtained from more highly condensed condensation products. The new impregnated cellulosic material treated according to the present process exhibits an extraordinarily improved water stability, even when the resin content is low. It is also possible by means of the present invention to employ papers having very low absorption powers. The invention is especially applicable in the production of impregnated papers which are to be used as electrical insulating materials. The invention also finds special application in the binding of tubes, etc.

The following table will serve to set forth the differences in stability and water absorbability which exist between products produced according to the present invention and those produced according to methods heretofore known in the art.

|  | (a) Normal process | (b) New process | Difference in favor of new process |
|---|---|---|---|
| Flexible stability | 1900 kg/cm² | 2500 kg/cm² | Percent 31 |
| Splitting stability | 160 kg | 240 kg | 50 |
| Water absorption | 9.3% | 2.5% | 270 |

The differences exhibited above are more striking when it is realized that the resin content of the paper which was impregnated according to the process of this invention amounted to only 30%, while the resin content of the paper impregnated in the usual manner amounted to 50%. It is evident that less resin need be employed in the present invention in order to obtain products which are decidedly superior to those now known in the art.

In the specification and claims of this application the expression "phenol aldehyde" is used in the generic sense and is not intended to be limited to any particular phenol or any particular aldehyde.

I claim:

1. The process which comprises impregnating cellulosic material with a synthetic resin consisting of a phenol-aldehyde condensation product having a solubility for water of at least 18% and subjecting the impregnated material to the action of heat and pressure.

2. The process which comprises impregnating paper with a synthetic resin consisting of a cresol-formaldehyde condensation product having a solubility for water of at least 18% and subjecting the impregnated paper to the action of heat and pressure.

3. Resin impregnated water stable cellulosic material obtainable by impregnating cellulosic material with a synthetic resin consisting of a phenol-aldehyde condensation product having a solubility for water of at least 18% and subjecting the impregnated material to the action of heat and pressure.

4. The process which comprises impregnating sheets of cellulosic material with a synthetic resin consisting of a phenol-aldehyde condensation product having a solubility for water of at least 18% and forming the sheets into a single composite structure by applying heat and pressure to said sheets.

5. Composite laminated resin impregnated water stable cellulosic materials obtainable by impregnating sheets of cellulosic material with a synthetic resin consisting of a phenol-aldehyde condensation product having a solubility for water of at least 18% and forming the sheets into a single composite structure by applying heat and pressure to said sheets.

6. The process which comprises impregnating sheets of paper with a synthetic resin consisting of a phenol-aldehyde condensation product having a solubility for water of at least 18% and forming the sheets into a single composite structure by applying heat and pressure to said sheets.

PETER PINTEN.